No. 630,826. Patented Aug. 8, 1899.
B. J. DOWNS.
POP SAFETY VALVE.
(Application filed Dec. 20, 1897. Renewed Feb. 2, 1899.)

(No Model.)

WITNESSES.
Matthew M. Blunt
R. P. Elliott

INVENTOR.
Benjamin J. Downs,
by N. H. Pencer
ATT'Y.

THE NORRIS PETERS CO., PHOTO-LITHO., WASHINGTON, D. C.

UNITED STATES PATENT OFFICE.

BENJAMIN J. DOWNS, OF ASHBURNHAM, MASSACHUSETTS, ASSIGNOR OF ONE-THIRD TO HENRY WASHBURN SMITH DOWNS, OF FITCHBURG, MASSACHUSETTS.

POP SAFETY-VALVE.

SPECIFICATION forming part of Letters Patent No. 630,826, dated August 8, 1899.

Application filed December 20, 1897. Renewed February 2, 1899. Serial No. 704,303. (No model.)

*To all whom it may concern:*

Be it known that I, BENJAMIN J. DOWNS, of Ashburnham, in the county of Worcester and State of Massachusetts, have invented a new and useful Improvement in Pop Safety-Valves, of which the following, taken in connection with the accompanying drawings, is a specification.

This invention is in the nature of an improvement upon a well-known class of safety-valves used on locomotives and elsewhere under a high pressure of steam, the object being to prevent the chattering or rumbling sound and the wear upon the parts incident to the trembling of the valve as the steam escapes from such pressure.

It is common in pop-valves to press the valve down upon its seat by a powerful spring with an adjusting-screw to give the desired tension, to form an annular recess in the under face of a radial flange on the valve overhanging its seat, and to apply around said seat a threaded adjustable ring having an annular upturned rib adapted to slightly enter said annular recess, causing the steam thus to pass through an annular chamber immediately surrounding the valve-seat. The conflicting pressures of the spring and the escaping steam make the valve tremble and strike violently upon its seat and inclosing neck, while the outer wall of its recessed flange strikes the rib of the adjustable ring, causing serious wear and the objectionable rumble familiar when a locomotive-engine is delayed at a station. I obviate this in a very simple way. I have discovered and demonstrated that if an additional annular chamber is formed in and between said flange and ring, surrounding and of greater area than the first, the rate of vibration is changed by using the steam therein expansively and the noise ceases.

My invention therefore consists in a safety-valve of otherwise suitable construction having an adjustable ring surrounding its valve-seat and provided with a spring-pressed valve having a radial flange overhanging said ring and a plurality of annular steam-chambers between them.

Figure 1:
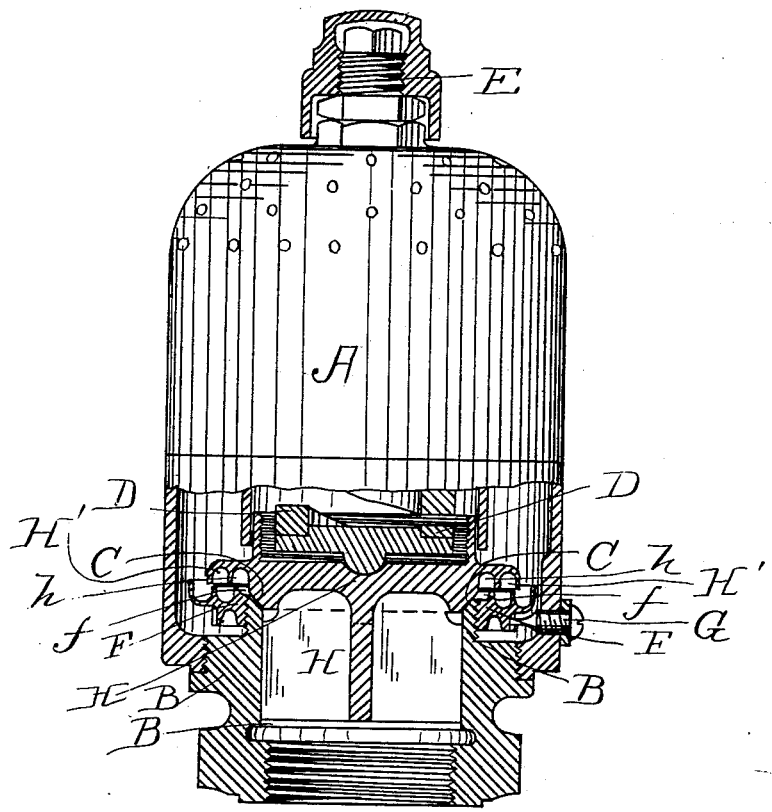
Figure 2:
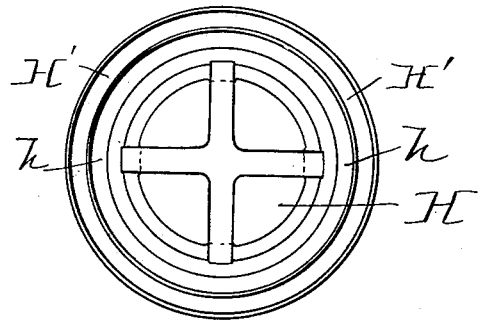

In the drawings, Figure 1 is a vertical section of a pop-valve embodying my invention, some details of ordinary construction being omitted. Fig. 2 is a bottom plan of the movable valve.

A represents the shell or body of the valve, and B the threaded neck on which it is mounted.

C is the valve-seat, upon which the valve is pressed by the spring D and adjusting or tension screw E.

F represents the threaded adjustable ring, screwed upon the neck B, surrounding the valve-seat. Its periphery is milled coarsely or toothed, so that it may be raised or lowered slightly by a partial rotation effected by introducing a suitable pointed tool through the hole shown occupied by the small screw G. This ring has, as heretofore, the annular rib $f$, beveled or curved upwardly, immediately adjoining the valve-seat.

H is the movable valve, resting by its tapering face upon the valve-seat, its stem having radiating ribs fitting within the neck B and its body formed with a marginal flange overhanging the ring F. In the under side of this flange I form a plurality of annular recesses forming steam-chambers, two or more, surrounding the valve-seat. The innermost chamber $h$ is such as has heretofore been known, the other, H', of greater area, is added by my improvement and receives the steam after its escape to and action in chamber $h$. This outermost chamber H' may be formed of equal recesses in the ring F and the marginal flange or mainly in the flange only. The construction shown in Fig. 1 is highly satisfactory in practice.

Steam under full pressure lifts the valve slightly from its seat and escapes first into the chamber $h$ and afterward and immediately into the larger chamber H', where it expands and its tension is somewhat lessened. Thence it passes between the outer margins of the ring F and valve H into the open interior of the body A. The variations in diameter of the valve at the line of its seat and its outer margin, with the changes in pressure thereat, cause conflicting vibrations which counteract or nullify each other, so that the rumbling sound is suppressed.

I claim as my invention—

A safety-valve having an adjustable ring surrounding its valve-seat, and provided with a spring-pressed valve having a radial flange overhanging said ring, and a plurality of annular steam-chambers between them, the outer chamber having a greater area than the inner one, substantially as set forth.

In testimony whereof I have signed my name to this specification, in the presence of two subscribing witnesses, on this 2d day of December, A. D. 1897.

BENJ. J. DOWNS.

Witnesses:
A. H. SPENCER,
H. C. ROGERS.